Aug. 21, 1951
H. F. FOLEY ET AL
2,564,888
CAB MOUNTING FOR MOTOR VEHICLES
Filed June 24, 1946
3 Sheets-Sheet 1
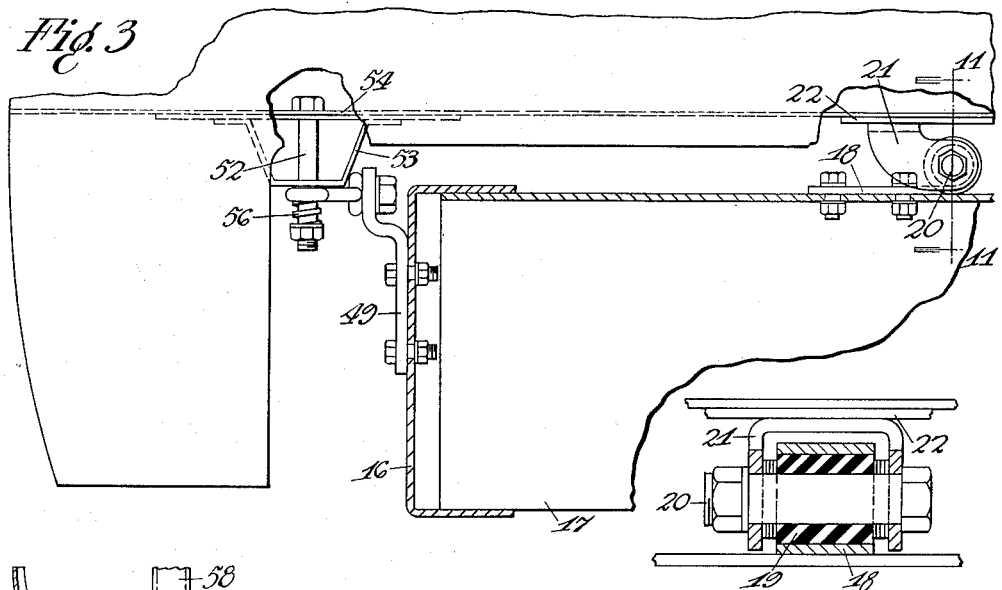
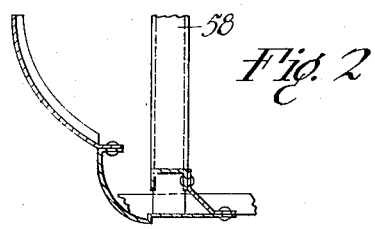
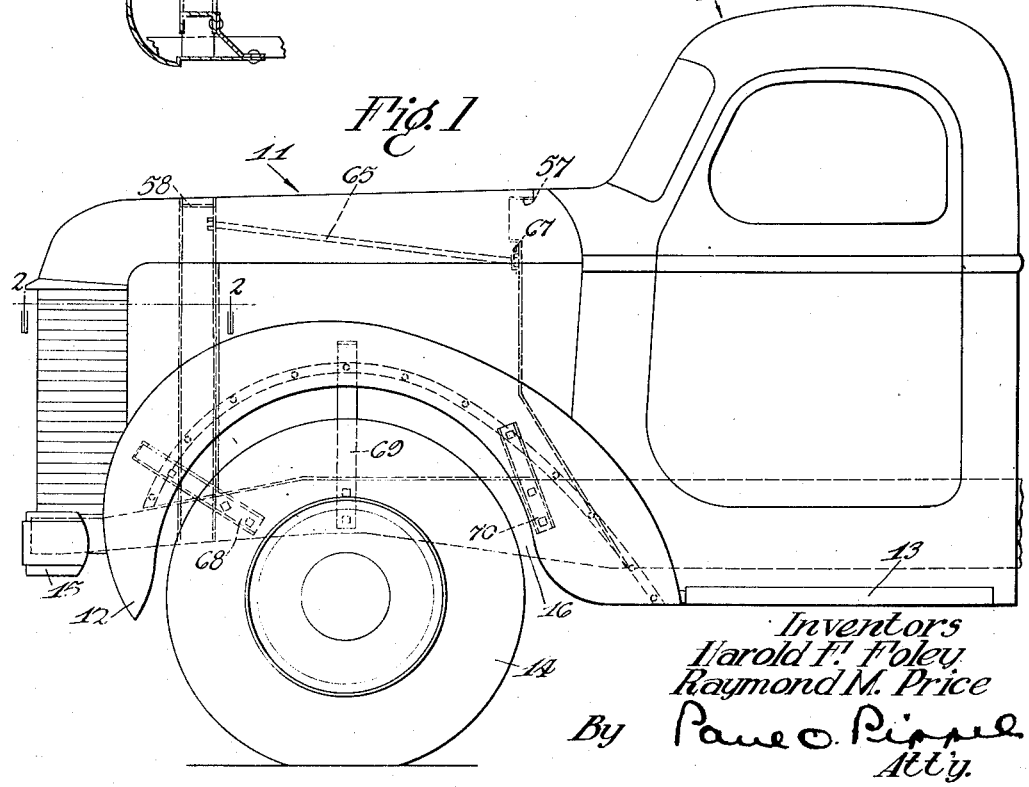
Inventors
Harold F. Foley
Raymond M. Price
By Paul O. Pippel
Atty.

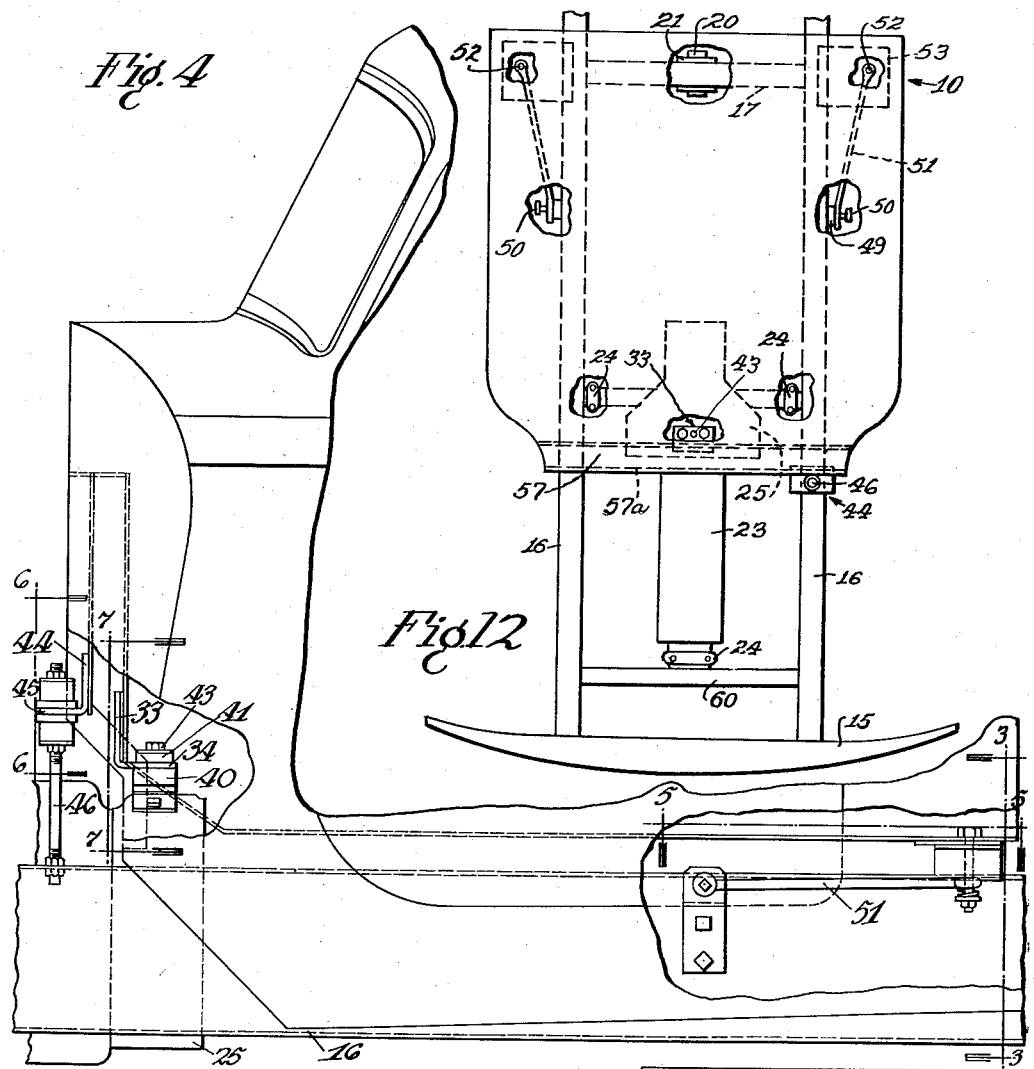
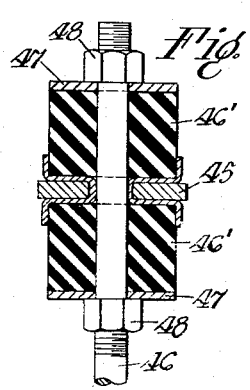
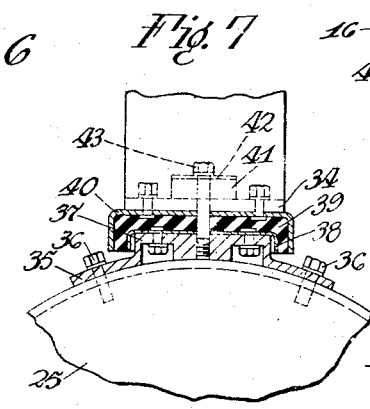
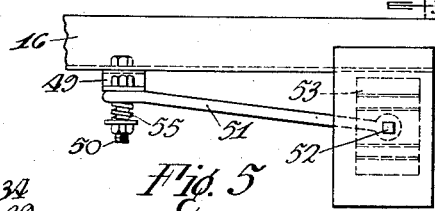

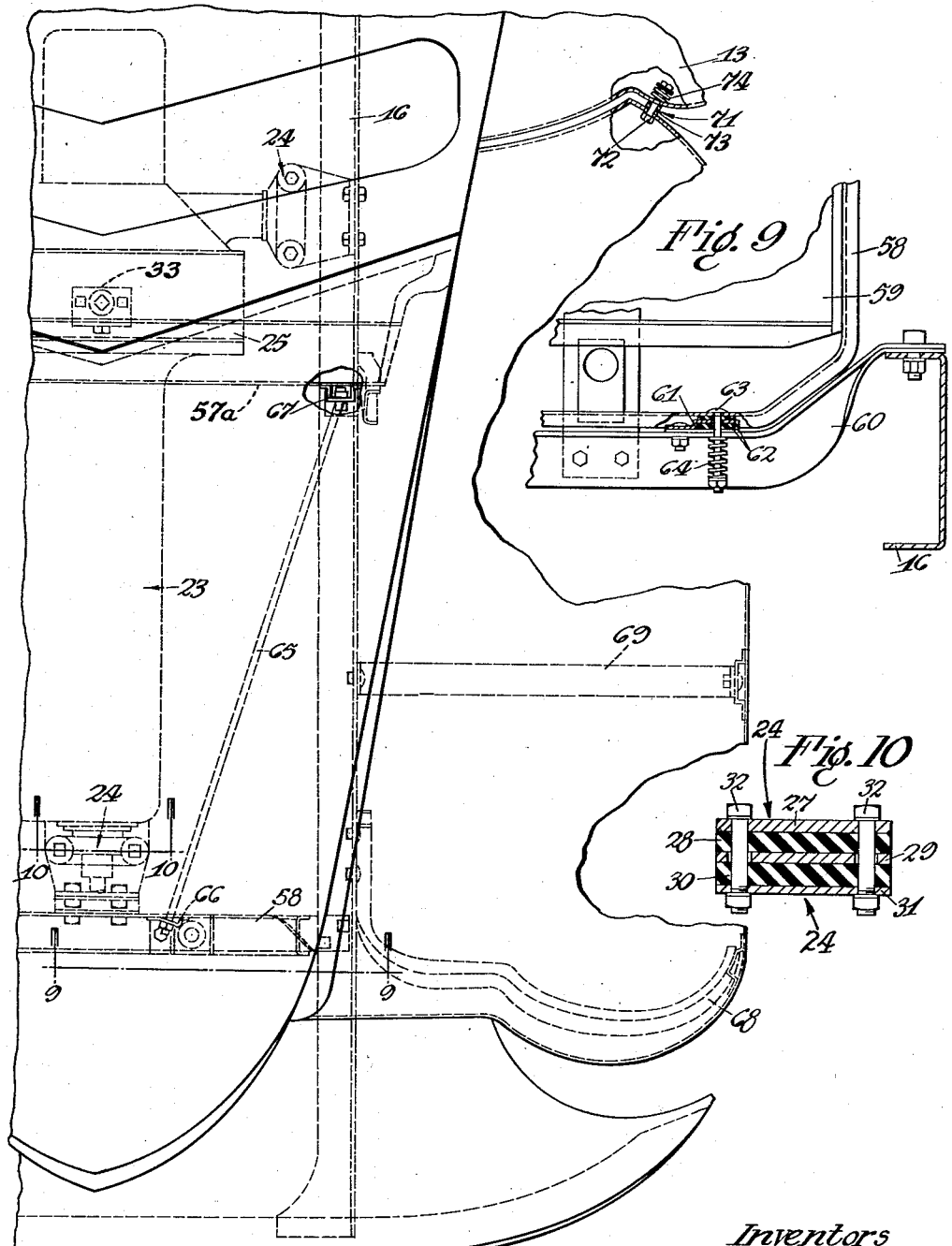

Patented Aug. 21, 1951

2,564,888

UNITED STATES PATENT OFFICE 2,564,888

CAB MOUNTING FOR MOTOR VEHICLES

Harold F. Foley and Raymond M. Price, Fort Wayne, Ind., assignors to International Harvester Company, a corporation of New Jersey Application June 24, 1946, Serial No. 678,808

18 Claims. (Cl. 180—89)

This invention relates to a cab mounting for automotive vehicles. More specifically, it relates to a cab mounting permitting limited flexibility between the frame and power plant of the vehicle and the cab.

In the design and construction of automotive vehicles for carrying heavy loads, it has been found impractical to construct the frame with sufficient rigidity to withstand the torsional forces imposed thereupon during operation of the vehicle. Therefore, the frames have generally been constructed in such a way that they are relatively flexible thereby relieving the forces thereon without damage to the frame members.

With a relatively flexible frame consideration must be given to mounting the power plant and the cab so as to permit flexing of the frame and not to impose destructive forces on the power plant structure or the cab. There is also a major problem involving the sheet metal work, particularly the hood and radiator grill construction which is mounted on the frame and connected to the cab. Relative movement of these parts not only produces undesirable noises but produces fatigue and damage in the parts.

The principal object of the present invention is to provide an improved cab mounting for a vehicle having a relatively flexible frame.

Another major object is to provide a cab mounting utilizing a floatingly mounted power plant as one of the supports for the cab.

Another significant object is to construct a cab and hood construction movable as a unit and to provide aligned pivot points for oscillating movement of the entire structure about a longitudinal axis and to provide stabilizing means for said structure.

The above objects and others which will be apparent from the detailed description to follow, are accomplished by a preferred construction representing one embodiment of the invention as shown in the attached drawings, in which Figure 1 is a side elevational view of the front end of a motor vehicle embodying the invention;

Figure 2 is a detail section of the line 2—2 of Figure 1;

Figure 3 is a vertical section on line 3—3 of Figure 4;

Figure 4 is an enlarged view of the cab portion of Figure 1 with portions broken away in section to better show certain of the cab mounting structure;

Figure 5 is a horizontal section taken on the line 5—5 of Figure 4;

Figure 6 is a section taken on the line 6—6 of Figure 4;

Figure 7 is a section taken on the line 7—7 of Figure 4;

Figure 8 is a plan view of the forward end of the vehicle structure shown in Figure 1 with certain portions broken away in section to show various connections of different parts;

Figure 9 is a partial section taken substantially on the line 9—9 of Figure 8;

Figure 10 is a section taken on the line 10—10 of Figure 8;

Figure 11 is a section taken on the line 11—11 of Figure 3, and

Fig. 12 is a diagrammatic plan view showing the relative positions of the connections between the cab, power plant and frame.

The vehicle structure, illustrated somewhat diagrammatically in Figure 1, represents a conventional truck construction having a cab designated in its entirety by the reference character 10, a hood structure designated in its entirety by the reference character 11, fenders 12, running boards 13, and wheels 14. A bumper 15 is also shown in Figure 1. The front axle springs and connecting shackles are not shown in Figure 1 nor in Figure 8 as they may be of any conventional construction and have no significance in a structure representing the invention.

The frame of the vehicle illustrated consists essentially of spaced, parallel, longitudinally extending, frame members 16 one of which is shown in Figures 1, 4, 5, 8, 9, and 11. A rear transverse frame supported member 17, as shown in Figure 3, connects the side frame members 16 and provides a support for a bracket 18 located centrally between the side frame members 16. The bracket 18, as best shown in Figure 11, carries an annular rubber bushing 19 through which a pivot pin 20 extends. Said pin is carried by a U-shaped bracket 21 which is secured to the bottom of the cab substantially under the center of gravity thereof by a suitable means, a bottom plate 22 of the cab being indicated in Figure 11. The pin 20 together with the other associated parts provides a longitudinal pivot axis for the cab centrally of the frame and substantially under its center of gravity.

A power plant, designated in its entirety by the reference character 23, as best shown in dotted lines in Figure 8, is mounted in a conventional manner between the side frame members 16 at the forward end thereof. Said power plant is resiliently connected at three points to the vehicle frame to prevent the application of torsional forces to the power plant and to permit the oscillation of said power plant about a longitudinal axis. The mounting means for the engine are diagrammatically illustrated as consisting of resilient mounting structures designated in their entirety by the reference character 24, two being provided at the rear of the power plant adjacent a clutch housing 25 and one being located centrally of the power plant at the front end thereof. As shown in Figure 10, each mounting means includes a bracket member 27 adapted to be secured to the vehicle frame, a layer 28 of resilient material such as rubber, a member 29 extending from the power plant, a second layer 30 of resilient material, a clamping member 31, and securing bolts 32. Such a construction eliminates metal to metal contact between the power plant and the frame and thereby reduces the transfer of vibration and noise to the power plant. Said resilient mountings also permit the power plant to oscillate at its own frequency and prevents the application of torsional forces from the frame to the power plant. As a result of this type of mounting, the power plant is the most stable portion of the chassis frame with regard to twisting and road shocks and vibrations.

As best illustrated in Figures 4 and 7, the cab is provided with an L-shaped bracket 33 having a vertical portion and a horizontal portion 34 which provide means for mounting the front of the cab on the clutch housing 25 of the power plant substantially in longitudinal alignment with the center of gravity of the cab. As shown in Figure 7, a bracket structure 35 secured to the clutch housing by bolts 36 is provided with a horizontal top face 37 on which one channel member 38 of a resilient mounting means is secured. A layer or pad of resilient material 39 is fitted over the channel member 38 and a second channel member 40 is fitted over the pad 39 to complete the resilient mounting means. The member 39 is secured to the horizontal portion 34 of the bracket 33. Additional means is provided for maintaining the supporting means in position, said means including a block 41 of resilient material, a clamping member 42 above said material, and a threaded bolt 43 extending through the members 38 and 40 and the pad 39 and being threaded into a central portion of the bracket 38. The power plant 23 which extends between the side frame members 16 constitutes a forward transverse frame supported member which with the rear transverse frame supported member 17 provides means for supporting the cab at points spaced longitudinally of the frame. It will be noted that the front mounting means for the cab is substantially in longitudinal alignment with the mounting for the rear of the cab. As the cab 10 is mounted for oscillation on a generally horizontal and longitudinal axis, it is necessary to provide a third mounting means for stabilizing the cab against oscillation on this axis. A bracket 44 secured to a front wall of the cab includes a horizontal and forwardly extending portion 45 through which a vertical bar 46 extends. The bar 46, as best shown in Figure 4, is rigidly secured to a horizontal web of one of the side members 16. As best shown in Figure 6, said bar is connected to the bracket portion 45 by rubber bumper blocks 46' on each side of the bracket portion, retainer washers 47 and threaded nuts 48 whereby a two-way resilient mounting means is provided. Said nuts may be adjusted to position the cab relative to the frame about its longitudinal pivot axis.

In order to remove strain from the rear central cab mounting, additional stabilizing means are provided at each side of the cab. Each of said structures includes a bracket 49 secured to the vertical portion of the corresponding side frame member 16, a horizontal and laterally extending bolt 50, a link 51, a vertically extending bolt 52, and a bracket structure 53 secured to a bottom wall 54 of the cab. Springs 55 and 56 on the bolts 50 and 52 maintain the link 51 in position for normal movement yet provide for excess movements upon severe twisting of the vertical frame. The links 51 at opposite sides of the frame hold the frame against fore and aft movement while providing the necessary resiliency in the mounting means.

The hood structure 11 at its rear portion overlaps and seats on a ledge portion 57 formed on a forwardly projecting portion of the cab 10, as shown in Figure 1. The hood structure is carried adjacent its forward end on a generally rectangular frame 58 of a conventional design which also supports the vertical radiator 59. The frame 58, as best shown in Figure 9, is supported at laterally spaced locations on a transverse frame member 60 connected to the side frame members 16. Each of said mounting means includes a bracket 61 secured to the cross frame member 60, a pair of resilient strips 62, such as rubber, positioned on opposite sides of the member 61, a bolt 63, and a spring 64. Said construction permits oscillation of the frame 58 with respect to the cross frame member 60 upon twisting of the vehicle frame relative to the cab and hood structure. This resilient or yielding movement prevents the imposing of damaging strains on the sheet metal parts of the hood structure.

As shown in Figures 1 and 8, rearwardly diverging rods, one of which, 65, is visible in the portions of the vehicle which are shown, are connected to bracket structures 66 at their forward ends on the frame 58 and to bracket structures 67, on the front vertical portion 57a of the cab, at their rear ends. Said rods brace the hood structure and hold it for movement with the cab while permitting a certain amount of flexibility. It will be noted that the mounting means for the frame 58 are such as to provide for oscillation of said frame on a pivot axis substantially in alignment with the mounting means for the front and rear of the cab.

The fenders 12 are supported directly on the side frame members 16 by means of brackets 68, 69, and 70. Said fenders are therefore free to move with the side frame members and are substantially independent of twisting movement on the frame. As shown in Figure 8, the fenders are stabilized at their rear ends by connecting structures 71 which join with the running boards 13. Each connecting structure includes a bolt 72, a rubber spacer 73, and a spring 74. The openings through which the bolts extend are sufficiently large to permit substantially relative movement of the rear end of the fender with respect to the running board without imposing a severe strain on either of the members.

The functioning of the cab mounting means as above described is evident from the structures which were specifically explained in the foregoing description. The cab is provided with a rear mounting means including the pin 20, a forward mounting means including the resilient pad 39 which gives a longitudinal, substantially horizontal supporting axis which is entirely independent of twisting of the side frame members 16. In order to stabilize the cab, a third mounting point is provided in the form of a vertical bar 46 together with the resilient connections which tend to dampen out vibrations and to prevent the imposition of sudden shocks on the cab while permitting the cab to move with the frame structure. This three-point mounting eliminates any torsional strains on the cab. As it is necessary to connect the sheet metal hood structure to the cab, this structure is braced by the rods 65 to follow substantially the movements of the cab. This movement is in turn provided for by mounting the frame 58 for a substantial movement of oscillation with respect to the transverse frame member 60. It will be understood by this construction extreme twisting of the frame members 16 relative to one another imposes very little strain upon the cab and hood structure thereby permitting a cab of minimum strength and giving maximum operator comfort. Another significant feature of this invention is that one of the cab mounting points is on a so-called floating power plant. This power plant, being supported at three points on the frame structure, has a neutral position with respect to twisting of the frame and the point on the clutch housing where the front of the cab is mounted has been found to be most satisfactory for the mounting of a cab in the respect of transmitting the minimum amount of road shock to the cab and the minimum amount of movements due to frame distortion.

Applicant claims as his invention all modifications of cab mounting structures set forth in the appended claims.

What is claimed is:

1. A cab mounting for an automotive vehicle having a longitudinally extending frame, a power plant mounted thereon and supported entirely on the frame for limited floating movement with respect thereto and a cab mounted above the frame including a mounting connection between the cab and the frame, and a mounting connection for the cab on said power plant whereby said cab is partly supported by said power plant.

2. A cab mounting for an automotive vehicle having a longitudinally extending frame, a power plant mounted thereon and supported entirely on the frame for limited floating movement with respect thereto and a cab mounted above the frame comprising two mounting connections between the cab and the frame, and a third mounting for the cab on said power plant whereby said cab is partly supported by said power plant.

3. A cab mounting for an automotive vehicle having a longitudinally extending frame, a power plant mounted thereon and supported entirely on the frame for limited floating movement with respect thereto and a cab mounted above the frame comprising two laterally spaced mounting connections between the cab and the frame, and a third mounting for the cab on said power plant whereby said cab is partly supported by said power plant.

4. A cab mounting for an automotive vehicle having a longitudinally extending frame, a power plant mounted at the front of the vehicle and supported entirely on said frame for limited floating movement with respect thereto and a cab mounted above the frame comprising a mounting connection between the cab and the frame, a mounting for the cab on said power plant whereby said cab is partly supported by said power plant, said mountings permitting limited oscillation of the cab, and a third connection between the frame and the cab, said third connection being resilient.

5. A cab mounting for an automotive vehicle having a longitudinally extending frame, a power plant mounted at the front of the vehicle and supported entirely on said frame for limited floating movement with respect thereto and a cab mounted above the frame at the rear of the power plant comprising a mounting connection between the rear of said cab and the frame, a front mounting for the cab on said power plant whereby said cab is partly supported by said power plant, said mountings permitting limited oscillation of the cab, and a third connection between the frame and the cab, said third connection being resilient.

6. A cab mounting for an automotive vehicle having a longitudinally extending frame including laterally spaced side frame members, a power plant mounted at the front of the vehicle on the frame and entirely supported thereby between said side frame members for limited floating movement with respect thereto and a cab mounted above the frame at the rear of the power plant comprising a mounting connection between the rear of said cab and the frame, a front mounting for the cab on said power plant whereby said cab is partly supported by said power plant, said mountings permitting limited oscillation of the cab, and a stabilizing connection between the frame and the cab.

7. A cab mounting for an automotive vehicle having a longitudinally extending frame consisting of laterally spaced side frame members, an engine mounted at the front of the vehicle on the frame and entirely supported thereby between said side frame members for limited floating movement with respect thereto and a cab mounted above the frame at the rear of the engine comprising a mounting connection between the rear of said cab and the frame substantially centrally thereof, a front mounting for the cab on the rear of the engine and centrally thereof whereby said cab is partly carried by said engine, said mountings permitting limited oscillation of the cab, and a stabilizing connection between one side of the frame and the cab.

8. A cab mounting for an automotive vehicle having a longitudinally extending frame including laterally spaced side frame members and forward, intermediate and rear frame supported members therebetween, and a cab with a hood structure extending forwardly therefrom and secured to the cab for movement therewith mounted above the frame between said frame supported members comprising a mounting connection between the rear of said cab and the rear frame supported member for pivotal movement on a longitudinal axis intermediate the side frame members, a front mounting for the cab on the intermediate frame supported member intermediate the side frame members substantially in longitudinal alignment with the rear cab mounting and a mounting connection between the hood structure and the forward frame supported member, said mountings permitting limited oscillation of the cab about a longitudinal axis substantially under the center of gravity of the cab, and an additional mounting connection between the frame and the cab spaced laterally from said axis, said last named mounting connection being yieldable.

9. A cab mounting for an automotive vehicle having a longitudinally extending frame consisting of laterally spaced side frame members, a power plant mounted at the front of the vehicle between said side frame members for oscillation about a generally longitudinal axis with respect thereto, and a cab mounted above the frame at the rear of the power plant comprising a cross frame member connecting said side frame members at the rear of the cab, a mounting connection between the rear of said cab and said cross member for pivotal movement on a longitudinal axis intermediate the side frame members, a front mounting for the cab on said power plant substantially in longitudinal alignment with the rear cab mounting, said mountings permitting limited oscillation of the cab about a longitudinal axis substantially under the center of gravity of the cab, and a third mounting connection between the frame and the cab consisting of a vertical mounting member extending from one of the side frame members and connected to the cab by a bracket rigidly secured to the cab and secured to said vertical member by a two-way resilient mounting means.

10. A cab mounting for an automotive vehicle having a longitudinally extending frame including laterally spaced side frame members, a power plant mounted at the front of the vehicle between said side frame members for oscillation about a generally longitudinal axis with respect thereto, and a cab mounted above the frame at the rear of the power plant comprising a cross frame member connecting said side frame members at the rear of the cab, a mounting connection between the rear of said cab and said cross member for pivotal movement on a longitudinal axis intermediate the side frame members, a front mounting for the cab on said power plant substantially in longitudinal alignment with the rear cab mounting, said mountings permitting limited oscillation of the cab about a longitudinal axis substantially under the center of gravity of the cab, and a third mounting connection between the frame and the cab consisting of a vertical mounting member extending from one of the side frame members and connected to the cab by a bracket rigidly secured to the cab and secured to said vertical member by a two-way resilient mounting means, and stabilizing means for said cab including stabilizing members connected to the cab at each side thereof outwardly of the side frame members, said stabilizing members extending forwardly and angularly inwardly toward the center of the vehicle and being secured to the side frame members.

11. A cab mounting for an automotive vehicle having a longitudinally extending frame consisting of laterally spaced side frame members, a power plant mounted at the front of the vehicle between said side frame members for oscillation about a generally longitudinal axis with respect thereto, a cab mounted above the frame at the rear of the power plant, a radiator and hood assembly supported by yielding front supports disposed on opposite sides of the longitudinal center line at the front of the frame and to the cab for movement therewith, and a cross frame member connecting said side frame members at the rear of the cab comprising a mounting connection between the rear of said cab and said cross member for pivotal movement on a longitudinal axis intermediate the side frame members, a front mounting for the cab on said power plant substantially in longitudinal alignment with the rear cab mounting and the front support for said power plant, said mounting permitting limited oscillation of the cab about a longitudinal axis substantially under the center of gravity of the cab, and a resilient mounting connection between one of the frame members and the cab.

12. A cab mounting for an automotive vehicle having a longitudinally extending frame consisting of laterally spaced side frame members, an engine mounted at the front of the vehicle between said side frame members, said engine being floatingly mounted by two resilient supports at the rear on the frame member and a single resilient support at the front of the frame for oscillation about a generally longitudinal axis, a cab mounted above the frame at the rear of the engine, and a cross frame member connecting said side frame members at the rear of the cab comprising a mounting connection between the rear of said cab and said cross member for pivotal movement on a longitudinal axis intermediate the side frame members, a front mounting for the cab on said engine substantially in longitudinal alignment with the rear cab mounting, said mounting permitting limited oscillation of the cab about a longitudinal axis substantially under the center of gravity of the cab, and a resilient stabilizing connection between the frame and the cab at a point spaced laterally from the oscillation axis.

13. A cab mounting for an automotive vehicle having a longitudinally extending frame consisting of laterally spaced side frame members, an engine mounted at the front of the vehicle between said side frame members, said engine being floatingly mounted by two resilient supports at the rear on the frame member and a single resilient support at the front on the frame for oscillation about a generally longitudinal axis, a cab mounted above the frame at the rear of the engine, and a cross frame member connecting said side frame members at the rear of the cab comprising a mounting connection between the rear of said cab and said cross member for pivotal movement on a longitudinal axis intermediate the side frame members, a front mounting for the cab on said engine substantially in longitudinal alignment with the rear cab mounting, said mounting permitting limited oscillation of the cab about a longitudinal axis substantially under the center of gravity of the cab, and a third mounting connection between the frame and the cab consisting of a vertical mounting member extending from one of the side frame members and connected to the cab by a bracket rigidly secured to the cab and secured to said vertical member by a two-way resilient mounting means.

14. A cab mounting for an automotive vehicle having a longitudinally extending frame consisting of laterally spaced side frame members, an engine mounted at the front of the vehicle between said side frame members, said engine being floatingly mounted by two resilient supports at the rear on the frame member and a single resilient support at the front on the frame for oscillation about a generally longitudinal axis, a cab mounted above the frame at the rear of the engine, and a cross frame member connecting said side frame members at the rear of the cab comprising a mounting connection between the rear of said cab and said cross member for pivotal movement on a longitudinal axis intermediate the side frame members, a front mounting for the cab on said engine substantially in longitudinal alignment with the rear cab mounting, said mounting permitting limited oscillation of the cab about a longitudinal axis substantially under the center of gravity of the cab, a third mounting connection between the frame and the cab consisting of a vertical mounting member extending from one of the side frame members and connected to the cab by a bracket rigidly secured to the cab and secured to said vertical member by a two-way resilient mounting means, and stabilizing means for said cab including stabilizing members connected to the cab at each side thereof outwardly of the side frame members, said stabilizing members extending forwardly and angularly inwardly toward the center of the vehicle and being secured to the side frame members.

15. A cab mounting for an automotive vehicle having a longitudinally extending frame including laterally spaced side frame members, a power plant mounted at the front of the vehicle between said side frame members for limited floating movement with respect thereto, a cab mounted above the frame at the rear of the power plant and a hood structure extending forwardly from the cab over the power plant and secured to the cab for movement therewith comprising a mounting connection between the rear of said cab and the frame, a front mounting for the cab on said power plant, said mountings permitting limited oscillation of the cab and hood structure as a unit, and a stabilizing connection between the frame and the cab.

16. A cab mounting for an automotive vehicle having a longitudinally extending frame including laterally spaced side frame members, a power plant mounted at the front of the vehicle between said side frame members for limited floating movement with respect thereto, a cab mounted above the frame at the rear of the power plant and a hood structure extending forwardly from the cab over the power plant and secured to the cab for movement therewith comprising a mounting connection between the rear of said cab and the frame, a front mounting for the cab on said power plant, said mountings permitting limited oscillation of the cab, a stabilizing connection between the frame and the cab, and a yielding mounting connection between the front of the hood structure and the frame.

17. A cab mounting for an automotive vehicle having a longitudinally extending frame including laterally spaced side frame members and three longitudinally spaced frame supported members therebetween, a cab with a hood structure extending forwardly therefrom and secured to the cab for movement therewith mounted above the frame between said frame supported members comprising a mounting connection between the rear of said cab and one frame supported member for pivotal movement on a longitudinal axis intermediate the side frame members, a front mounting for the cab on another frame supported member intermediate the side frame members substantially in longitudinal alignment with the rear cab mounting and a mounting connection between the hood structure and the third frame supported member, said mountings permitting limited oscillation of the cab about a longitudinal axis substantially under the center of gravity of the cab, and a third yieldable mounting connection between the frame and the cab spaced laterally from said axis.

18. A cab mounting for an automotive vehicle having a longitudinally extending frame including laterally spaced side frame members, a power plant mounted at the rear of the vehicle between said side frame members for oscillation about a generally longitudinal axis with respect thereto, a cab mounted above the frame at the rear of the power plant and a hood structure extending forwardly over the power plant and connected to the cab for movement therewith comprising a cross frame member at the front of the power plant, a transverse frame member connecting said side frame members at the rear of the cab, a mounting connection between the rear of said cab and said transverse member for pivotal movement on a longitudinal axis intermediate the side frame members, pivotal mounting means between the front of the hood structure and the central portion of the front cross frame member, a front mounting for the cab on said power plant substantially in longitudinal alignment with the rear cab mounting, said mountings permitting limited oscillation of the cab and hood structure about a longitudinal axis substantially under the center of gravity of the cab, and a stabilizing mounting connection between the frame and the cab consisting of a mounting member extending from one of the side frame members and connected to the cab.

HAROLD F. FOLEY.
RAYMOND M. PRICE.

REFERENCES CITED

The following references are of record in the file of this patent:

UNITED STATES PATENTS

| Number | Name | Date |
|---|---|---|
| 549,763 | Brown | Nov. 12, 1895 |
| 746,941 | Facer et al. | Dec. 15, 1903 |
| 1,071,335 | Pembroke | Aug. 26, 1913 |
| 1,384,269 | Milner | July 12, 1921 |
| 1,743,612 | Lee | Jan. 14, 1930 |
| 2,171,947 | Parker | Sept. 5, 1939 |
| 2,266,116 | Best | Dec. 16, 1941 |
| 2,328,518 | Wahlberg et al. | Aug. 31, 1943 |